Aug. 8, 1939.   J. D. KELLEY   2,168,994
CAMERA SHUTTER TESTER
Filed March 20, 1937   2 Sheets-Sheet 1

James D. Kelley
INVENTOR.
BY
ATTORNEYS

Aug. 8, 1939.    J. D. KELLEY    2,168,994
CAMERA SHUTTER TESTER
Filed March 20, 1937    2 Sheets-Sheet 2

James D. Kelley
INVENTOR
BY
ATTORNEYS

Patented Aug. 8, 1939

2,168,994

UNITED STATES PATENT OFFICE 2,168,994

CAMERA SHUTTER TESTER

James D. Kelley, Rochester, N. Y., assignor to Eastman Kodak Company, Rochester, N. Y., a corporation of New Jersey Application March 20, 1937, Serial No. 132,172

9 Claims. (Cl. 88—14)

This invention relates to a method and apparatus for measuring short intervals of time and more particularly to the measuring of the minute time intervals defined by the operation of a camera shutter.

Various methods have been proposed for testing and calibrating camera shutters. It is an object of the present invention to provide a simple method of doing this which will give an immediate and accurate reading.

It is well known that when a camera shutter is operated for taking snapshots, the shutter opens, remains open for a short interval of time, and then closes. The total time consumed includes the time of opening, the time open, and the time of closing. It is a particular object of the invention to provide an apparatus for accurately measuring the "average open time" of a camera shutter, that is, the time interval, in which the total amount of light (passed by the shutter in its normal operation) would pass, if the shutter remained fixed at full opening.

A measurement of this type has a very real advantage over measurements which define the total time between the operation of the shutter trigger and the instant at which the shutter becomes again completely closed. The advantage is due to the fact that the exposure suffered by a photographic film, which is, of course the exposure in which one is interested, is approximately proportional to the average open time of the shutter rather than to the total time elapsed between the initial and final movements of the shutter blades.

According to the invention a method of measuring the average open time of a camera shutter is provided wherein an electric charge is established and stored which is proportional to the total area-time units corresponding to the operation interval (i. e., to the total amount of light transmitted during the interval). Also an electric current is established which is similarly proportional to the maximum area of the shutter opening. The ratio of the magnitude of this charge to the magnitude of this current is the average open time of the shutter. It will be noted that the principle of correspondence of mass-length-time units is directly satisfied since the ratio of an electric charge to an electric current has the dimensions of a time.

In one embodiment of the invention which will be described below, the above method includes a convenient way of noting this ratio between the charge and current as follows. The charge is stored in a condenser having a capacity which may or may not be adjustable and the current is passed through a resistance which also may or may not be adjustable. Thus two separate potential differences are set up, one across the condenser and the other across the resistance. When the resistance and/or the capacity is adjusted until these two potentials are equal, the ratio of the charge to the current (i. e., the average open time of the shutter) is equal to the product of the capacity and the resistance. In mass-length-time units, this product has the dimensions of a time. The adjustment of the resistance and capacity until the ratio of the potentials is a predetermined value different from unity would merely introduce this value as a third factor in the capacity resistance product.

This embodiment of the invention may include an electric circuit having two photoelectric cells as shown in Fig. 3 adapted to receive light from the same or similar sources, one through the shutter during the interval to be tested and the other through an aperture which transmits a luminous flux equal to that transmitted by the shutter set at full opening (i. e., on "time" position). Preferably, however, the circuit for the two separate photoelectric cells is arranged so that only one cell is required as will be described in connection with Figure 2. Thus an electric circuit is provided having a photo-electric cell adapted to receive light transmitted by the shutter being tested and is so arranged that two readings are taken; one when the shutter is operated at the interval to be determined, and the other when the shutter is fixed open so that a continuous beam of light falls on the photoelectric cell. As will be described in detail below, the electric constants of the circuit may be adjusted until the two readings, which are indicative of the potentials mentioned above, are equal; at which time a numerical result may be computed from these constants which is proportional to the ratio between the total light passed by the shutter during the interval being determined and the amount of light passed per unit of time by the shutter at full opening. It is obvious that this ratio gives directly the average open time of the shutter. In fact, the adjustment mechanism of an instrument including this electric circuit may be provided with a scale reading directly in units of time. I have found that reasonably accurate readings may be taken according to the invention over a range from 0.001 second to 1.5 seconds.

Other objects and advantages of the invention will become apparent from the following description when read in connection with the accompanying drawings in which.

Figure 1:
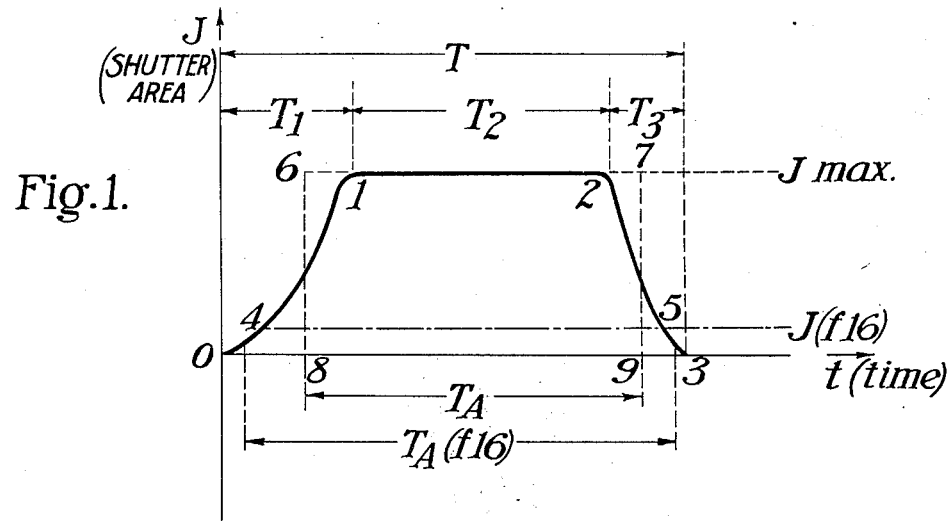
Fig. 1 shows a graph representing the variation in open area of the shutter (or the variation in luminous flux transmitted thereby) with time, measured from the instant when the shutter trigger is operated.

The invention will be most clearly understood from the following simple, mathematical discussion of both the operation of a camera shutter and the electric circuit embodying the invention. The curve 0—1—2—3 shown in Fig. 1 is a graphical representation of shutter area J versus time t during the interval to be tested, say 1/25 of a second. The total time T between the operation of the shutter trigger and the final closing of the shutter blades (indicated at 0 and 3 respectively) may be divided into three parts, the time of opening T1, the time opened T2, and the time of closing T3. The maximum area of the shutter $J_{max}$, depends, of course, on the diaphragm aperture used therewith. For example, if the camera diaphragm were set at f.16 say, the area vs. time curve would be 0—4—5—3 as shown on the graph.

The amount of light transmitted by the shutter during the interval T is proportional to the area under the curve 0—1—2—3. From the definition given above for average open time $T_A$, it will be obvious that the area represented by the product of $T_A$ and $J_{max}$ should be equal to this area under the curve 0—1—2—3 (i. e., the area on the rectangle 6—7—8—9).

The efficiency of any camera shutter may be defined as the ratio of $T_A$ to T. The efficiency of a camera shutter is particularly important when photographing moving objects, since the amount of blurring in this case is proportional to the total time T, whereas the amount of exposure is proportional to the average open time $T_A$. If the camera diaphragm accompanying the shutter is closed down to an aperture of say f.16, the average open time $T_A$ (f.16) will be considerably greater than $T_A$.

Thus the efficiency of a shutter is greater for smaller apertures. In fact, since the average open time $T_A$ approaches the total time T as the camera diaphragm is closed, it is possible to obtain a very close approximation of the efficiency of a camera shutter at full opening by taking the ratio of the average open time at this full opening ($T_A$) to the average open time at very small aperture say f.16 ($T_A$f.16).

Thus the invention also provides a convenient method of approximating the efficiency of a camera shutter.

Figure 2:
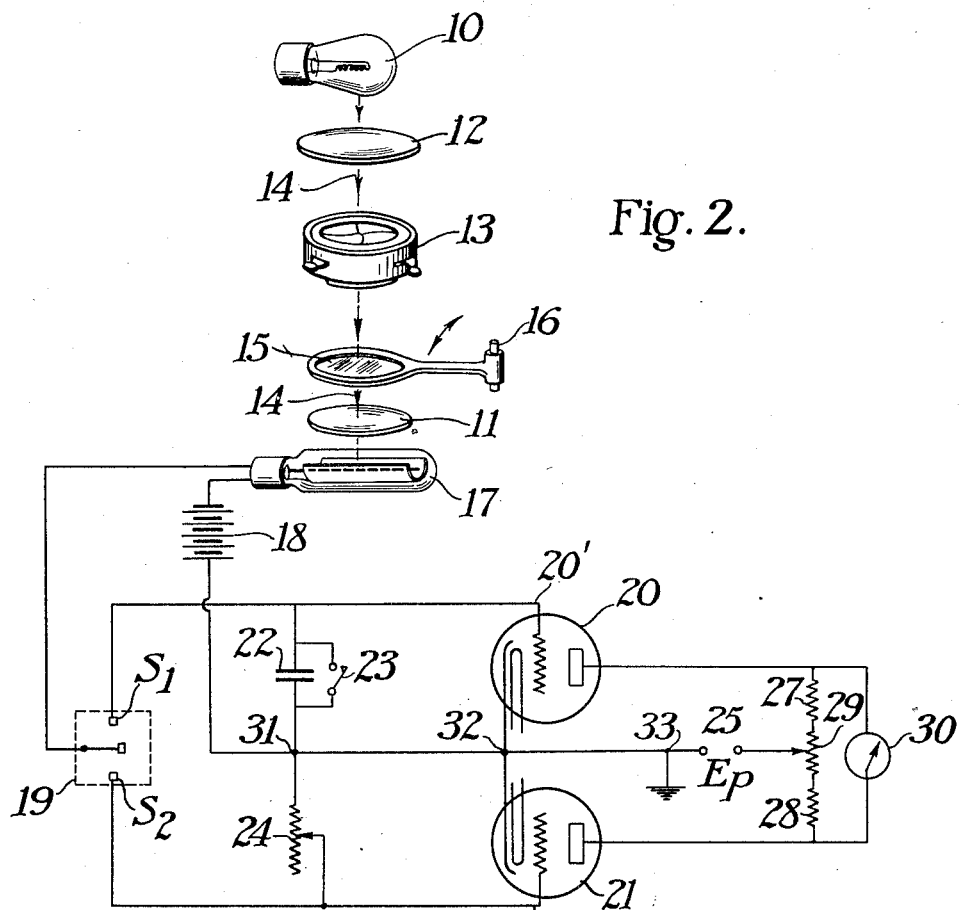
Fig. 2 shows one embodiment of the invention and the electric circuit used therewith.

In Fig. 2 a light source comprising a lamp 10 projects a beam of light represented by the broken line 14 and made substantially parallel by an optical system shown as a lens 12, to a camera shutter 13 which is to be tested or calibrated. By means of a lens 11, this light is directed to a photo-electric or other light sensitive cell 17, whose accompanying circuit will be discussed in detail below. As will also be pointed out below, it may be desirable to extend the range of the instrument by introducing a neutral density 15 into the light beam. The neutral density 15 is mounted on a support 16 so that it may be readily inserted or removed from the light beam.

The photo-electric cell 17 and a source of potential 18 therefor are adapted to be connected alternatively to two circuits (one including an electron discharge device 20 whose input is shunted by a condenser 22, the other including a similar electron discharge device 21 whose input is shunted by a resistance) through a two position switch 19 having positions S1 and S2 respectively.

The electron discharge devices 20 and 21 may be of any of the suitable well-known types, for example, triodes as shown. As will be discussed in detail below, the purpose of the triodes 20 and 21 and the subsequent electric circuits, is merely to determine when the potentials on their grids 20' and 21' are equal. Other suitable methods of measuring the potentials at these two points or of merely indicating when the potentials are equal may be employed without departing from the spirit of the invention. In this connection, the use of electron discharge devices provides the most convenient means of doing this and I have found that it is preferable to employ two balanced triodes as shown although circuits employing only one triode will suggest themselves to those skilled in the art.

In the particular arrangement shown, the output of both triodes 20 and 21 includes a source of potential 25, two fixed resistances 27 and 28, a variable resistance 29 and a galvanometer 30. With respect to the triode 20, the output circuit comprises the resistance 27 in parallel with a series circuit including the resistance 28 and the galvanometer 30. Likewise, with respect to the triode 21 the output circuit comprises the resistance 28 in parallel with the galvanometer 30 and the resistance 27 in series. The resistances 27 and 28 are equal; the purpose of the variable resistance 29 is to compensate for inherent differences in the triodes 20 and 21 so that equal potentials on the grids 20' and 21' will equally affect the galvanometer 30 and if these effects are imposed on the galvanometer simultaneously, a zero reading will be given. As is well known, it may also be desirable to have an adjustable control of the heater current of the triodes.

The operation of the device in accordance with the invention is as follows: The two-position switch 19 is closed in its position S1 and the shutter 13 is tripped at the time interval to be determined. During this time a shorting switch 23 across the condenser 22 is left open so that the impulse of current output from the photo-electric cell 17 due to the light falling thereon establishes a charge on the condenser 22 which determines the potential of the grid 20' and, hence, the reading on the galvanometer 30. The switch 19 is then thrown to the position S2 in a manner so that none of this charge is allowed to leak away, the camera shutter 13 is set at full opening (by using the time exposure position) and the variable resistance 24 is adjusted until the reading on the galvanometer 30 is brought back to zero, i. e. until the potential on the grid 21' is equal to the potential on the grid 20'. The care which must be exercised in performing this operation will be obvious to those skilled in the use of such circuits and need not be discussed in detail here. Obviously, the leakage from the grid 20' must be reduced to a minimum and the second opertion with the switch 19 in position S2 must be performed as quickly as possible to prevent the potential on the grid 20' changing sufficiently to affect the reading.

I have found that errors from this cause may be practically eliminated by arranging the potentials supplied to the triodes 20 and 21 so that the grid 20' is operating near its free potential. The triode 20 should be of such construction that very little leakage from the grid occurs therein; the condenser 22 should be of a high leakage resistance type, the switch 19 should be of a high leakage resistance type, and the photo-electric cell should have zero dark current so that it will not further affect the grid 20' during the interval before the switch 19 is moved from position S1 to position S2. I have found that the capacity of the photo-electric cell 17 does not introduce any error worthy of consideration.

Figure 3:
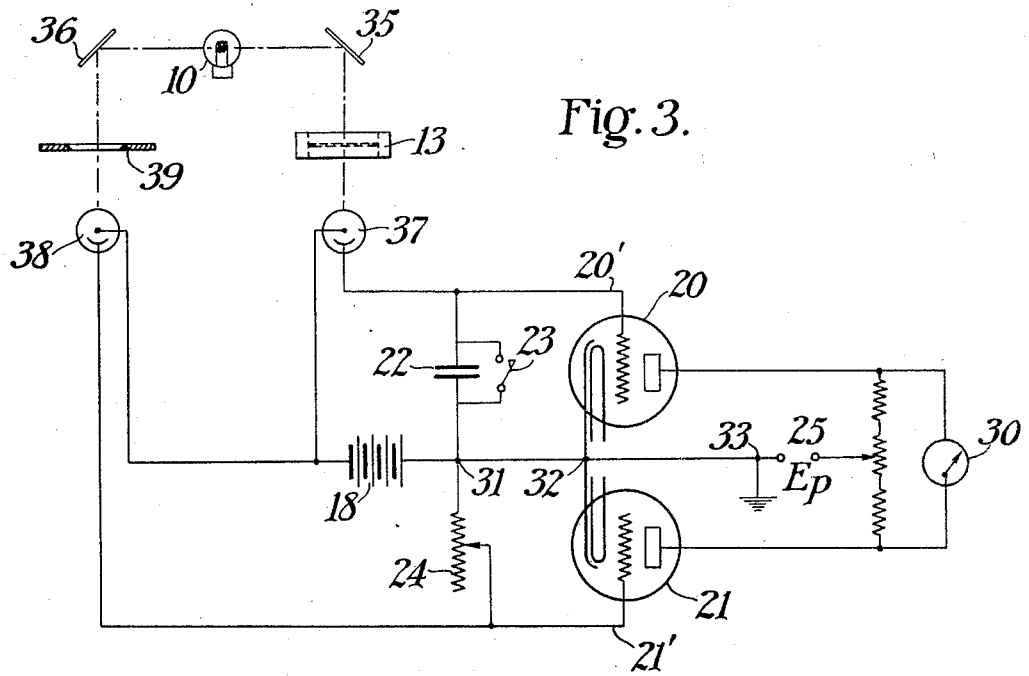
Figs. 3 and 4 show modifications of the arrangement shown in Fig. 2.

Fig. 3 illustrates the embodiment wherein separate photocells 37 and 38 are used instead of the single cell 17 with the two position switch 19 shown in Fig. 2. The light source 10 by means of reflectors 35 and 36, illuminates simultaneously the shutter 13 and an aperture 39 equal to the maximum aperture of the shutter 13 as determined by the diaphragm associated therewith. This aperture 39 may be adjusted from this equality to compensate for any difference in the intensity of the light beams from the reflectors 35 and 36.

Figure 4:
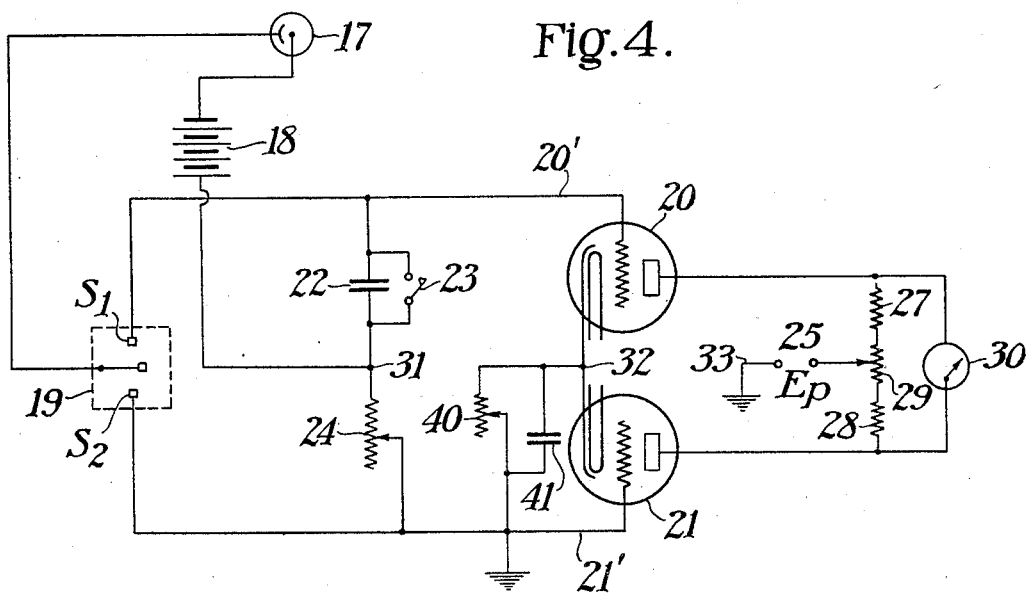

One slightly different arrangement shown in Fig. 4 for indicating when the potential charges imposed on the grids 20' and 21' are equal, has the advantage that the response curves of the triodes 20 and 21 need not be identical and is as follows. There is no direct connection between the points 31, 32 and 33. Instead of this, an impedance including a variable resistance 40 and a condenser 41 in parallel is connected between the point 32 (the cathodes) and the grid 21' which is grounded. The operation of this arrangement is practically identical to that described above, namely: the circuit is adjusted to give zero current through the galvanometer, the potential on the grid 20' is varied by tripping the shutter with the switch 19 in position S1, the switch 19 is moved to position S2, the shutter is fixed open and the variable resistance 24 is changed until the galvanometer 30 again reads zero.

In describing the theory of the electric circuit, the usual symbols are used as follows to describe the factors involved: Q equals the quantity of electric charge transmitted by the photo-electric cell 17 during the total time T of the shutter interval being tested. This charge Q is directly proportional to the amount of light falling on the photo-electric cell 17 during this interval T. The capacity of the condenser 22 will be called C and the potential on the grid 20' as determined by these two factors Q and C will be called $E_g20$.

The current flowing through the photo-electric cell 17 when the shutter 13 is left wide open will be called I; the resistance of the variable resistor 24, when the potential on the grid 21' ($E_g21$) is equal to the potential $E_g20$ as indicated by the galvanometer 30, will be called R. Furthermore, I shall use the letter $i$ to define the electric current flowing at any moment through the photo-electric cell 17 during the interval when the charge Q is being established.

Hence, the following two equations hold.

$$E_g20 = \frac{Q}{C} = \int_0^T \frac{i\,dt}{C} = \int_0^T \frac{kJ\,dt}{C}$$

Where $k$ is a constant of the light source 10 and the photo-electric cell 17, and J is the shutter area as defined in connection with Fig. 1.

$$E_g21 = IR = kJ_{max}R$$

Since R has been varied until $E_g20$ equals $E_g21$ as indicated by zero reading on the galvanometer 30, $$kJ_{max}R = \frac{k}{C}\int^T J\,dt$$

Therefore $$RC = \frac{k\int_0^T J\,dt}{KJ_{max}} = T_A$$

as previously defined.

Thus we have obtained the average open time $T_A$ directly as the product RC. Since C is constant, a scale reading directly in the time intervals may be mounted on the variable resistor 24.

If a condenser 22 having a capacity of the order of 0.1 $\mu f$ is used and the resistor 24 has a variable resistance R from 0.01 megohm to 0.15 megohm, a time range from 0.001 to 0.015 second is available. If the optical system is arranged so that neutral densities having densities of 1 and 2 respectively may be alternately inserted in the light beam at 15 during the first operation (namely, that in which the shutter is tripped), a result is produced which obviously is equivalent to increasing the capacity C by a factor of 10 and 100 respectively. The densities should be neutral throughout the entire part of the spectrum employed. In this manner the time range of the instrument can be extended continuously from .001 second to 1.5 seconds. Other methods of extending the time range such as varying the value of R or C or changing the intensity of the light source itself, may be used but are not as preferable from a commercial point of view and hence have not been described in detail.

It will be obvious to those skilled in the use of electric circuits of this type that various details therein may be varied without departing from the spirit of the invention. Having fully described one embodiment of the invention, I wish to point out that it is not limited to the specific arrangement shown but is of the scope of the appended claims.

What I claim and wish to protect by Letters Patent of the United States is:

1. A device of the character described for measuring the average open time of a camera shutter having a maximum aperture defining means associated therewith which comprises a light source positioned to illuminate the shutter, a photo-cell adapted to receive alternatively the light transmitted by the shutter during one operation and the light continuously transmitted by the shutter fixed open at said maximum aperture, means for alternatively connecting the output of the photocell to two electrical elements one of which is an electrical condenser to receive the output of the photocell corresponding to the light received during the shutter operation whereby a charge is imposed on the condenser, and a potential established thereby, the other element being an electrical resistance for receiving the current output corresponding to the luminous flux falling on the photo-cell when the shutter is fixed open whereby across the resistance another potential is established, means for adjusting at least one of the electrical elements to bring to a predetermined value the ratio of said potentials and means for indicating the product of the capacity and resistance as adjusted.

2. A device for determining the ratio of a quantity of light to a luminous flux which comprises photosensitive means adapted to receive the quantity of light and to translate it to an electric charge proportional to said quantity, photosensitive means adapted to receive the luminous flux and to translate it to an electric current similarly proportional to said flux, an electric impedance connected to the first mentioned photosensitive means and having capacity for holding said charge, an electric impedance connected to the second mentioned photosensitive means having resistance for passing said current, means for adjusting at least one of said impedances and means connected across the two impedances for indicating when the potentials across the impedances are equal.

3. The method of measuring the average open time of a camera shutter which comprises illuminating the shutter, operating the shutter through one interval opening and closing it, photo-electrically receiving all of the light transmitted by the shutter and translating this light to an electric charge proportional to the total luminous energy transmitted during the shutter operation, setting the shutter at maximum opening, photoelectrically receiving the light transmitted through said open shutter and translating said last mentioned light to an electric current similarly proportional to the luminous flux when the shutter is thus set at full opening and noting the ratio of said charge to said current.

4. The method of measuring the average open time of a camera shutter which comprises illuminating the shutter, operating the shutter through one interval opening and closing it, receiving on photoelectric means the light energy transmitted by the shutter, photoelectrically translating said light energy into electrical energy, storing in a circuit including said photoelectric means and having a known capacity, said electrical energy as an electric charge proportional to the total luminous energy transmitted during the shutter operation whereby an electrical potential is established, setting the shutter at maximum opening, receiving on photoelectric means the light energy transmitted by the open shutter, photoelectrically translating said last mentioned light energy into electrical energy, passing said last mentioned electrical energy through a circuit having resistance to produce an electric current similarly proportional to the luminous flux at full shutter opening, adjusting the resistance to cause a potential difference thereacross equal to the first mentioned potential and noting the product of the magnitudes of said known capacity and said resistance as adjusted.

5. The method of measuring the average open time of a camera shutter which comprises illuminating the shutter, operating the shutter through one interval opening and closing it, receiving on photoelectric means the light energy transmitted by the shutter, photoelectrically translating said light energy into electrical energy, storing in a circuit including said photoelectric means and having a known capacity, said electrical energy as an electric charge proportional to the total luminous energy transmitted during the shutter operation whereby an electrical potential is established, setting the shutter at maximum opening, receiving on photoelectric means the light energy transmitted by the open shutter, photoelectrically translating said last mentioned light energy into electrical energy, passing said last mentioned electrical energy through a circuit having resistance to produce an electric current similarly proportional to the luminous flux at full shutter opening, adjusting the resistance to cause a potential difference thereacross which bears a predetermined ratio to the first mentioned potential and noting this ratio times the product of the magnitudes of said known capacity and said resistance as adjusted.

6. A device of the character described for measuring the average open time of a camera shutter having a maximum aperture associated therewith which comprises a light source, photoelectric means adapted to receive from said source light transmitted by the shutter during its operation including opening and closing, photoelectric means of power substantially equal to the first mentioned photoelectric means and adapted to receive from said source light transmitted by an opening having an area equivalent in light transmission to said maximum aperture and a single electric circuit including a known capacity connected to the first mentioned photoelectric means for storing an electric charge proportional to the amount of light received by this photoelectric means, said single circuit also including a conductor with a known resistance connected to the second mentioned photoelectric means for passing an electric current similarly proportional to the luminous flux through said opening which is equivalent to the maximum aperture, said single electric circuit also including means for determining the ratio of said charge to said current, said ratio determining means including means for comparing the potential on said capacity with the potential across the resistance, the product of said capacity, said resistance and the ratio of these two latter potentials being the ratio of said charge to said current which latter ratio is said average open time.

7. A device according to claim 6 having a light filter with a predetermined filter factor positionable in the path of the light incident on said first mentioned photoelectric means to reduce said charge by said predetermined factor, the product of said factor, said capacity, said resistance and said ratio of potentials being said average open time.

8. A device according to claim 6 having a light filter with a predetermined filter factor positionable in the path of the light incident on said second mentioned photoelectric means to reduce said current by said predetermined factor, the product of said ratio of potentials, said capacity and said resistance reduced by said predetermined factor being said average open time.

9. The method of determining approximately the efficiency of a camera shutter when the diaphragm associated therewith is set at a large relative aperture which comprises illuminating the shutter, setting the shutter open at this large aperture to transmit a luminous flux proportional to the area of this aperture, operating the shutter at this large aperture, through one interval opening and closing it to transmit an amount of light similarly proportional to said area times the average open time of the shutter, measuring the ratio of said amount of light to said flux to give the average open time of the shutter at this large aperture, similarly setting the shutter open at a small aperture to transmit a luminous flux proportional to the area of this small aperture, operating the shutter at this small aperture, through one interval opening and closing it to transmit an amount of light similarly proportional to said small aperture area times the average open time of the shutter at this small aperture, measuring the ratio of this latter amount of light to this latter flux to give the average open time of the shutter at this small aperture and taking the ratio of the average open time at large aperture to the average open time at small aperture to give efficiency expressed as a fraction.

JAMES D. KELLEY.